Patented Mar. 29, 1927.

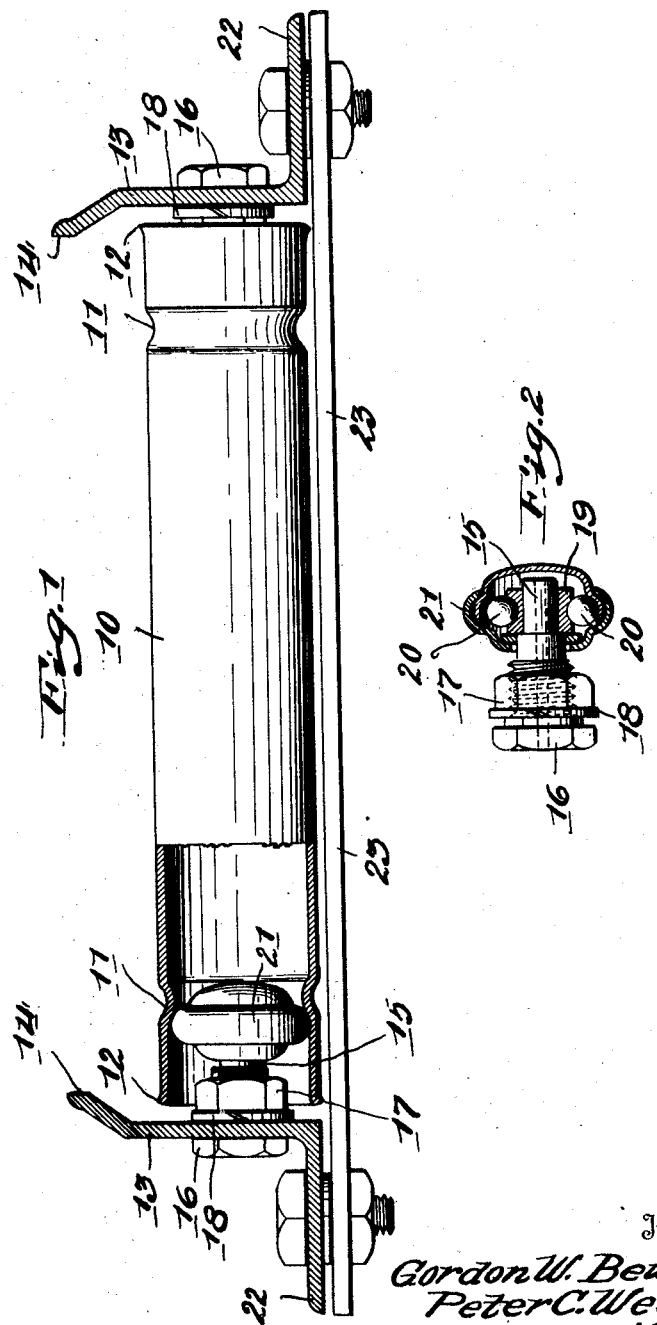

1,622,758

UNITED STATES PATENT OFFICE.

GORDON W. BEULKE AND PETER C. WEGO, OF ST. PAUL, MINNESOTA, ASSIGNORS TO STANDARD CONVEYOR COMPANY, A CORPORATION OF MINNESOTA.

ROLLER FOR GRAVITY CONVEYERS.

Application filed August 6, 1923. Serial No. 655,843.

It is our object to provide a roller for gravity conveyers in which the bearings are efficiently protected from abrasives and other injurious substances having a tendency to work into the bearings.

A further object of this invention is to provide a roller which has protected bearings and at the same time is of unusually simple and inexpensive construction.

Our invention also includes novel features of construction which will appear and be more fully pointed out in the following specification and claims.

Referring to the accompanying drawings, which illustrate our improved roller; Figure 1 is a side elevation of the roller partially in central section, the supporting rails being shown in section; and Figure 2 is a central, vertical section through one of the anti-friction bearings showing the pintle in elevation.

The roller proper consists of a tubular body 10 formed with annular grooves or crimps 11 pressed therein and having annular flanges 12 on its ends. The body 10 is supported in horizontal position between rails 13, offset guides 14 on said rails being disposed to overhang the flanges 12 on the body 10. Extending axially into the ends of the body 10 is a pair of pintles 15 formed with hexagonal heads 16 and secured to the rails 13 by nuts 17 threaded on said pintles adjacent to the inner face of said rails. Suitable spring washers 18 are placed between the nuts 17 and rails 13 to prevent accidental turning of the nuts.

Fitted on the inner end of each of the pintles 15 is a ball race or cone 19 for a series of anti-friction balls 20. The balls 20 are enclosed in a suitable cage 21 which is forced into the end of the tubular body 10 against the internal shoulder formed by the crimp 11. The tubular body 10 is thus supported directly upon the ball cages 21 at its ends. When the conveyer is assembled, the horizontal portions 22 of the rails 13 are connected at suitable intervals by transverse members 23 which are bolted thereto.

In use, the rollers are mounted with their axes parallel, between the rails 13, said rails being inclined sufficiently to cause articles placed on the upper peripheries of the tubular bodies 10 to move by gravity in the desired direction. The greater part of the dust or other matter which otherwise might reach the bearing is excluded from the ends of the tubular bodies 10 by the offset guides 14. These guides prevent the articles being transported from overhanging the ends of the rollers so that the greater part of the dirt or liquid that is scraped from the articles merely falls between the peripheries of adjacent rollers. Any injurious substance that does work toward the ends of the body 10 beneath the guides 14, will be prevented from reaching the bearing by the annular flanges 12 on the ends of the rollers and also by reason of the fact that the bearings on the pintle 15 are set well into the ends of the rollers. End thrust is transmitted from the rollers to the pintles 15 by the crimped portions 11 which engage the ball cages 21, a suitable annular shoulder being formed on the pintle 15 to receive the thrust from the cone 19.

The bearing of the present invention is not only efficiently protected from excessive wear but the roller is also unusually inexpensive and easy to install. Thus, by supporting the tubular body 10 directly on the ball cage 21, the usual hubs or heads forming the ends of the roller are eliminated and the size of the roller is reduced to a minimum. The present device is peculiarly adapted to transport small articles, such as brick, which require the supporting rollers to be mounted as close to each other as possible.

Having described our invention what we claim as new and desire to protect by Letters Patent is:

1. In a conveyer roller, a pair of rails, a tubular body extending transverse said rails between the same, means for revolubly supporting said body on said rails, and offset guide portions formed on said rails to overhang the ends of said tubular body.

2. In a conveyer roller, a pair of spaced rails, a tubular body extending transverse said rails between the same, supports for said body on said rails, annular flanges on the outer periphery of said body adjacent to said rails, and offset guide portions formed on said rails to overhang the flanges on said body.

3. In a conveyer roller, a pair of spaced rails, a tubular body extending transverse said rails between the same, pintles extending axially into said body from said rails, annular flanges on the outer periphery of said body adjacent to said rails, offset guide portions formed on said rails to overhang the flanges on said body, and bearings for said body on said pintles disposed a substantial distance from the ends of said body within the same.

4. In a conveyer roller, the combination with a pair of side rails, a tubular body extending transverse said rails between the same, supporting means for said body extending from said rails axially into said body, bearing casings formed from sheet metal arranged to directly engage the inner periphery of said tubular body, the inner surfaces of said casings being adapted to form a race for anti-friction bearings between said casing and supporting means, an outer end portion on each casing adapted to enclose said bearings and to close an end of said tubular body, said casing being located a substantial distance from the ends of said body within the same, and end thrust abutments formed in said body for engagement with said casings.

In testimony whereof, we have hereunto signed our names to this specification.

GORDON W. BEULKE.
PETER C. WEGO.